United States Patent [19]

Trail

[11] 4,252,241
[45] Feb. 24, 1981

[54] TIRE SUPPORT STAND

[76] Inventor: Ralph E. Trail, 89 Trumbull Dr., Hudson, Ohio 44236

[21] Appl. No.: 906,266

[22] Filed: May 15, 1978

[51] Int. Cl.³ .............................................. B29H 5/02
[52] U.S. Cl. ......................................... 211/23; 425/38
[58] Field of Search ...................... 211/23, 24; 425/38; 248/346, 176; 254/50.1–50.4; 144/288 A

[56] References Cited

U.S. PATENT DOCUMENTS

| | | | |
|---|---|---|---|
| 1,771,589 | 7/1930 | Strauss | 248/346 |
| 2,665,883 | 1/1954 | Glynn | 254/50.3 |
| 3,067,789 | 12/1962 | Roesch | 144/288 A |
| 3,317,069 | 5/1967 | Chin | 298/346 X |
| 3,448,487 | 6/1969 | Warnecke | 425/36 |
| 3,648,746 | 3/1972 | Beaman | 144/288 A X |
| 3,854,852 | 12/1974 | Carter | 425/DIG. 60 X |

Primary Examiner—James T. McCall
Assistant Examiner—Robert W. Gibson, Jr.
Attorney, Agent, or Firm—William R. Holland

[57] ABSTRACT

A tire support stand for holding and fully supporting the bead and sidewall portions of partially toroidally shaped uncured tire bands or green tire carcasses preparatory to loading into shaping and vulcanizing presses or molds is disclosed. The stand comprises a first fixed truncated cone member with its apex downward and a second concentric truncated cone member with its apex opposite or upward, the second member being mounted on a threaded shaft journaled in the base to which the first member is fixed, whereby the second member is adjustable in relation to the first. The first member is adapted to support the tire sidewall region; and the second, the tire bead. The tire stand is compatible with a wide range of tire sizes by virtue of the adjustment feature, and the full circumferential support of both the bead and sidewall portions prevents deformation and resultant adverse effects upon tire quality, performance and safety.

10 Claims, 3 Drawing Figures

TIRE SUPPORT STAND

The foregoing abstract is furnished merely to facilitate literature searching and to afford a general and cursory summary of the invention, and is not to be interpreted as limiting the scope and spirit of the invention. For an understanding of the full nature and extent of the present inventive improvement, reference must be made to the following detailed description in conjunction with the accompanying drawings and appended claims.

BACKGROUND OF THE INVENTION

The present invention relates generally to the shaping and curing of vehicle tires.

More particularly, the invention relates to tire supports or stands for holding uncured tire bands or green tire carcasses preparatory to loading into shaping and curing presses.

More specifically, this invention relates to a tire support stand, adjustable over a wide range of tire sizes, which fully circumferentially supports the sidewall and bead regions of partially toroidally shaped uncured tires such as radial tires.

In the manufacture of vehicle tires, both passenger and truck, the modern practice in the art of building and shaping and curing certain tires such as radial tires and certain off-the-road equipment and earthmover tires has been to form or partially shape the usually cylindrical or barrel shape uncured tire band or green tire carcass into a generally toroidal form prior to loading into an automatic shaping and curing press having separable mold sections, or insertion into separable molds for curing in a potheater or autoclave.

Since the tire curing cycle is relatively long in relation to the building cycle, and since the curing stage of the manufacturing process is capital-intensive in terms of the press and mold investment, provision must ordinally be made for green tire storage. Moreover, in recent years the industry, in order to increase productivity and reduce direct labor costs, has adopted automated or semiautomatic tire loading for the presses, whereby green tires are positioned on support stands in front of the presses while the same are closed shaping and curing other green tires.

Then, when the green tires inside the presses are shaped and cured, the presses automatically open and discharge the cured tires and automatically pick up the uncured tires on the stands in front and load them into the presses for shaping and curing.

One such version of semiautomatic loading and unloading apparatus is disclosed in U.S. Pat. No. 3,065,499 to Brundage, et al.

However, the storage and loading of the partially toroidally shaped green tires prior to curing have presented serious problems, particularly in the curing or press rooms with high ambient temperatures, in that the soft green tire carcasses tend to deform in the sidewall and bead areas.

Thus, difficulties and malfunctions are encountered in the automatic loading step; and adverse effects upon tire quality, performance and safety are experienced.

THE PRIOR ART

Despite the severity of the problems, the industry has been utilizing simple flat or pan-type support stands which support only the bead regions and which must be manually changed to accommodate various tire sizes, as the supports lack any adjustment.

One such flat or pan-type support is shown in U.S. Pat. No. 3,854,852 to Carter.

More recently, certain sector or segmental dished sidewall supports have been suggested. However, such supports, contrary to alleviating the deformation problems, tend to exaggerate them in the unsupported areas, particularly in the vicinity of the edges of the sectors or segments.

Moreover, such single member supports do not include members for supporting the bead regions of the uncured tires, thereby tending to promote rather than prevent deformation, again particularly in the unsupported sectors.

One such single member segment support is illustrated in the form of a dished horseshoe, toilet seat, U-shaped retainer in conjunction with a press loader in U.S. Pat. No. 3,448,487 to Warnecke.

SUMMARY OF THE INVENTION

It has been discovered that the deformation problems may be substantially alleviated or eliminated through use of the present invention of a novel tire support having concentric relatively movable truncated cone members with oppositely directed apexes. The invention possesses the further utility of being conveniently adjustable over a wide range of tire sizes, thereby greatly reducing the direct labor cost incurred in the size changeovers necessary with the prior art flat or pan supports.

Thus, utilization of the improved tire support of the present invention greatly improves tire quality, performance and safety, while effecting labor cost savings in manufacturing.

Elucidating a preferred embodiment of this improved apparatus accordingly becomes the principal object of this invention, with other objects of the invention becoming more apparent upon reading of the following brief specification, considered and interpreted in view of the accompanying drawings.

THE DRAWINGS

DESCRIPTION OF THE PREFERRED EMBODIMENT

Figure 1:
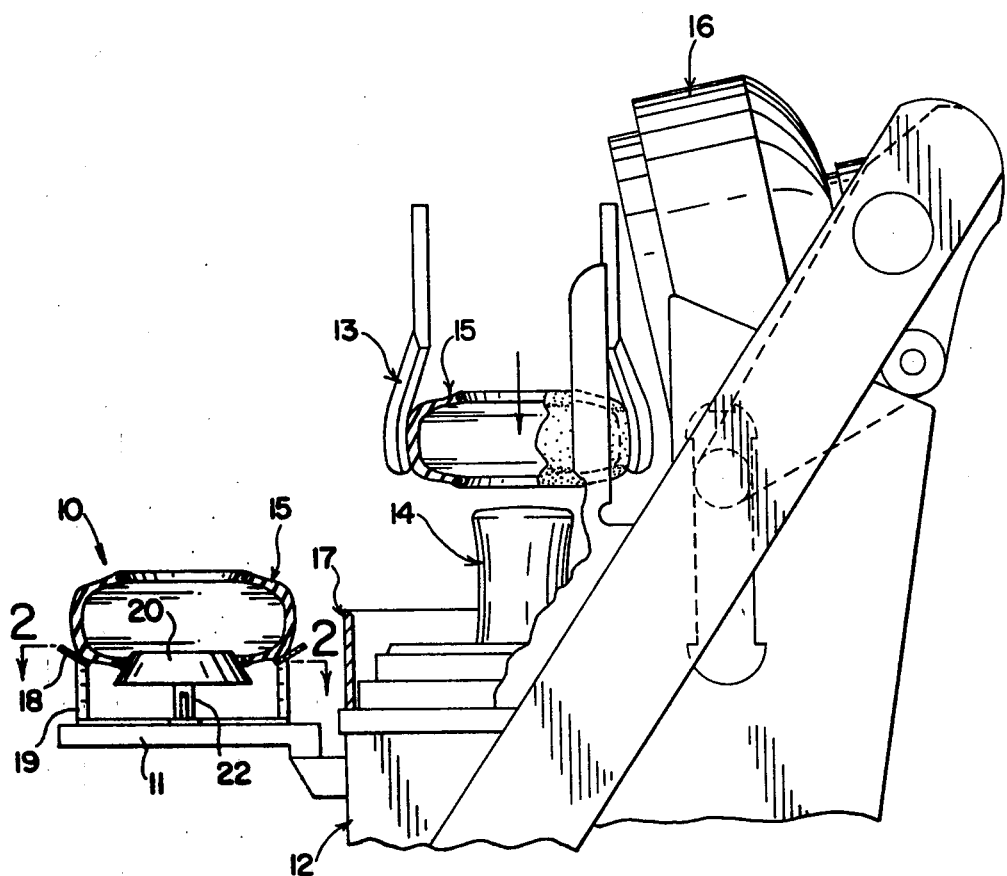
FIG. 1 is an elevation side view, partially shown in section, of the novel tire support of the present invention mounted on the front of an automatic tire shaping and curing press having an automatic loader adapted for partially preshaped generally toroidal green or uncured tires such as radial tires.

Referring to FIG. 1 of the drawings, the preferred embodiment of the improved tire support, generally designated by the number 10, is mounted on a suitable base bracket 11 which is affixed to the front of the frame of an automatic tire press 12 having separable mold sections for shaping and curing unvulcanized tires.

The press 12, as depicted, is of the type known by the trademark "Bag-O-Matic" manufactured by the NcNeil Corp. of Akron, Ohio; and it is a species well known in the art and industry of tire curing.

The press 12 also may be any of a number of other types well known in the art and industry, including in particular the types known by the trade-marks "Autoform" and "Slide-back" manufactured by the NRM Corp. of Akron, Ohio. The general construction and operation of these latter presses are disclosed in the aforementioned U.S. Pat. No. 3,065,499 to Brundage et al.

Moreover, as previously mentioned, the tire support 10 may be used in conjunction with curing of tires for off-the-road equipment or earthmovers in a potheater or autoclave.

The press is also equipped with a well known automatic loader 13 which translates laterally and vertically between the tire support 10 and the known center shaping mechanism 14 of the press 12, so as to load the uncured partially toroidally preshaped or radial tire 15 over the center mechanism 12 between the separable upper and lower clam shell articulating mold sections, generally designated by the numerals 16 and 17, respectively, of the press 12.

Figure 2:
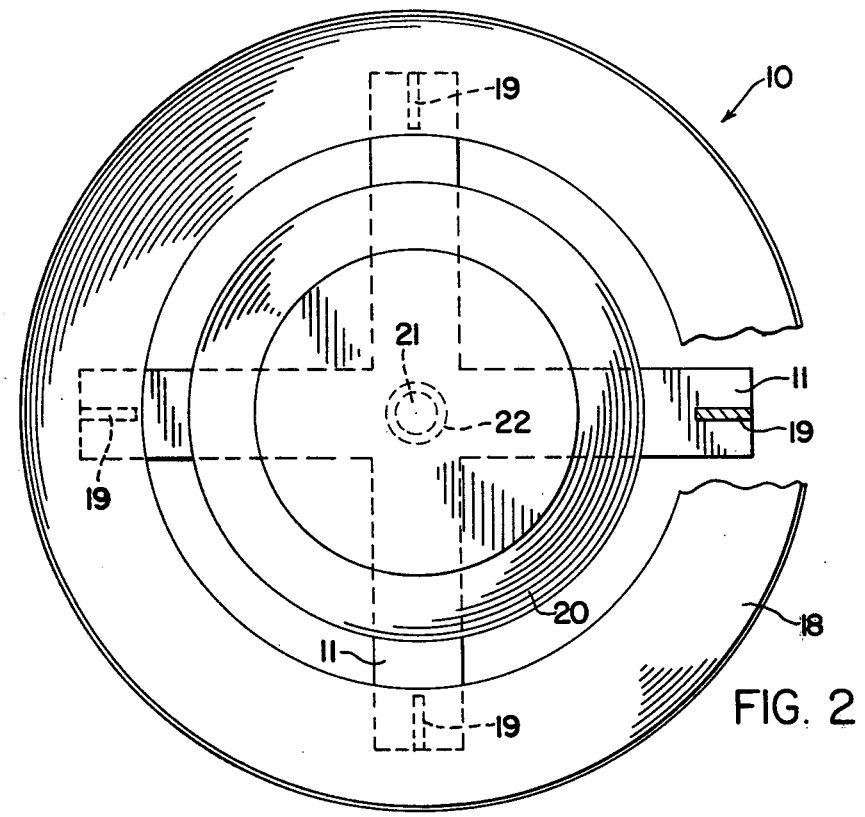
FIG. 2 is a plan view, partially broken away at the periphery, of the tire support, taken at lines 2—2 in FIG. 1.
Figure 3:
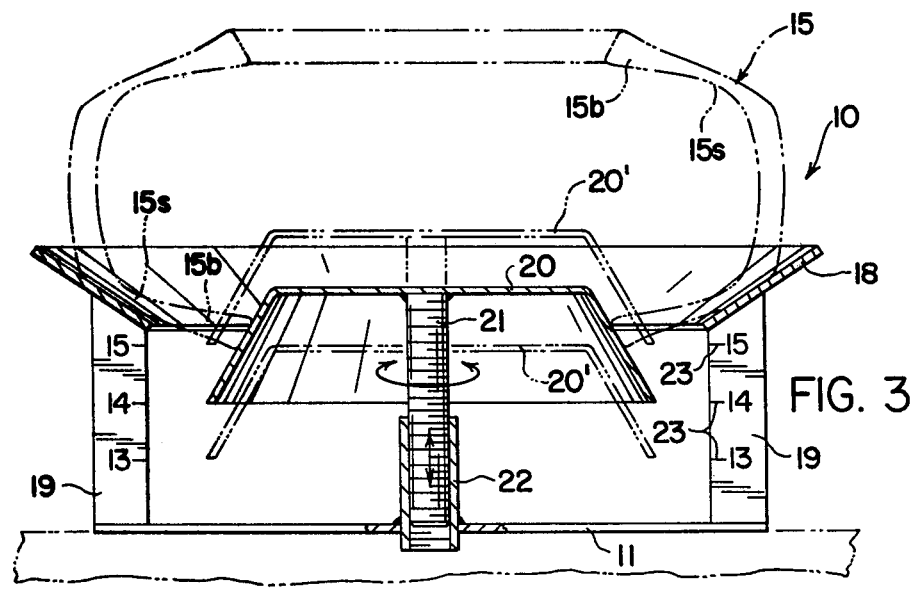
FIG. 3 is an elevation view, in section, of the tire support carrying an uncured radial tire.

Referring now to FIG. 2 and FIG. 3, it will be seen that the tire support has a first or upper truncated conical flange 18 which is affixed to the base bracket 11 by stanchion bars 19 and has its apex downwardly oriented.

Concentric with the conical flange 18, a second lower and inner truncated conical dome member 20 is affixed as by welding to a threaded shaft 21 which is journaled in a threaded tube or sleeve 22 which is affixed as by welding to the bracket 11.

As illustrated by the phantom line positions 20' in FIG. 3, the truncated conical dome member 20 is thus adjustable vertically to accommodate various inner diameters of the beads 15b of the uncured tires 15 to fully circumferentially support them. To facilitate efficient and accurate adjustments, size graduations 23 are preferably scribed on the sides of the stanchion bars 19.

As best seen in FIG. 3, the sidewall regions 15s and the bead regions 15b of the uncured partially toroidally preshaped or radial tire 15 are thus fully circumferentially supported by the upper truncated conical flange 18 and by the lower and inner truncated conical dome member 20, respectively, of the tire support stand 10.

It will be appreciated that the tire support stand 10 could easily alternatively be constructed in such a manner that the dome member 20 were fixed with the conical flange 18 vertically movable and thereby adjustable, although the depicted structure and mode of operation is preferred from the standpoint of cost and simplicity of operation.

The parts of the tire support stand 10 are preferably steel, which may be coated with No. 11 Carbozinc or other rust and corrosion retardant; although the parts could be of aluminum or other sturdy material.

While a full and complete description of the invention has been set forth in accordance with the dictates of the Patent Statutes, it is to be understood that the invention is not intended to be limited to the specific embodiment herein shown and described.

Accordingly, modifications of the invention may be resorted to without departing from the spirit hereof or the scope of the appended claims.

What is claimed is:

1. A tire support stand comprising a first generally conical member, for engaging the sidewall regions of a tire, and having its apex downwardly oriented and a second generally conical member concentric with and inwardly of said first conical member, for engaging the bead regions of a tire, and having its apex upwardly oriented.

2. A tire support stand, according to claim 1, wherein said conical members are relatively movable to adjust for various size tires.

3. A tire support stand, according to claim 1, wherein said conical members are truncated with their apexes oppositely directed.

4. A tire support stand, according to claim 1, wherein said first conical member is fixed in position and said second conical member is vertically movable to adjust for various size tires.

5. A tire support stand for uncured partially toroidally preshaped radial tires and the like having sidewall and bead regions; comprising first upper supporting means for substantially fully circumferentially supporting the abutting sidewall regions of said tire and second lower support means concentric with said first means for substantially fully circumferentially supporting the abutting bead regions of said tire.

6. A tire support stand, according to claim 5, wherein said first and second supporting means are relatively movable to adjust for various size tires.

7. A tire support stand, according to claim 5, wherein said first supporting means are fixed in position and said second supporting means are vertically movable to adjust for various size tires.

8. A tire support stand, according to claim 5, wherein said first and second supporting means are generally in the shape of truncated cones with oppositely oriented apexes.

9. A tire support stand, according to claim 5, wherein said second supporting means are adjustable in spatial relationship to said first supporting means to accommodate varying sizes of tires.

10. A tire support stand, according to claim 9, having graduated indexing means with predetermined calibrations for the various sizes.

* * * * *